US 9,204,295 B2

(12) United States Patent
Blommaert et al.

(10) Patent No.: US 9,204,295 B2
(45) Date of Patent: Dec. 1, 2015

(54) SYSTEM AND METHOD FOR AUTHENTICATING A CONTEXT TRANSFER

(75) Inventors: Marc Blommaert, Temse (BE); Dan Forsberg, Helsinki (FI); Frank Mademann, Berlin (DE); Valtteri Niemi, Lausanne (CH)

(73) Assignee: Nokia Corporation, Espoo (FI)

( * ) Notice: Subject to any disclaimer, the term of this patent is extended or adjusted under 35 U.S.C. 154(b) by 1353 days.

(21) Appl. No.: 12/259,479

(22) Filed: Oct. 28, 2008

(65) Prior Publication Data

US 2009/0111428 A1  Apr. 30, 2009

Related U.S. Application Data

(60) Provisional application No. 60/983,450, filed on Oct. 29, 2007.

(51) Int. Cl.
| | |
|---|---|
| *H04W 4/00* | (2009.01) |
| *H04W 12/04* | (2009.01) |
| *H04W 8/12* | (2009.01) |
| *H04W 8/06* | (2009.01) |
| *H04W 12/06* | (2009.01) |

(52) U.S. Cl.
CPC ............... *H04W 12/04* (2013.01); *H04W 8/12* (2013.01); *H04W 8/06* (2013.01); *H04W 12/06* (2013.01)

(58) Field of Classification Search
CPC .... H04W 76/022; H04W 60/04; H04W 76/00
USPC .................. 370/338, 328; 455/411, 410, 436
See application file for complete search history.

(56) References Cited

U.S. PATENT DOCUMENTS

2003/0211842 A1   11/2003  Kempf et al.

OTHER PUBLICATIONS

3GPP TR 33.821 "Rationale and track of security decisions in LTE RAN/3GPP SAE" published at Apr. 2007.*
3GPP TS 23.401 V1.2.0 (Sep. 2007) Technical Specification 3GPP TS 23.401 3rd Generation Partnership Project; Technical Specification Group Services and System Aspects; GPRS enhancements for E-UTRAN access(Release 8) at least Sep. 2007.*
3GPP TSG SA WG2 Architecture—S2#58, "RAU Procedure MME/ SGW to pre-Rel-8 SGSN", Jun. 25-29, 2007, pp. 1-5.

(Continued)

*Primary Examiner* — Ajit Patel
*Assistant Examiner* — Michael Irace
(74) *Attorney, Agent, or Firm* — Banner & Witcoff, Ltd.

(57) ABSTRACT

The user equipment (UE) and the Mobility Management Entity (MME) in an evolved 3GPP system generate authentication material that can be carried inside a packet switched network temporary mobile station identifier (P-TMSI) signature field of a Universal Mobile Telecommunications System (UMTS) signaling message from the UE to a UMTS/GPRS serving GPRS support node (SGSN) in a UMTS or GPRS Terrestrial Radio Access Network (UTRAN) or in a GSM/ Edge Radio Access Network (GERAN), as well as from the SGSN to the MME of the evolved 3GPP system. The MME authenticates a context transfer request from the UTRAN/ GERAN system based on the transferred authentication material and knowledge of how to create or to verify the authentication material. Additionally, the MME and the UE derive or verify authentication material, based on at least one user-specific key, for embedding in the P-TMSI signature field in legacy 3GPP signalling.

36 Claims, 5 Drawing Sheets

(56) References Cited

OTHER PUBLICATIONS

Anonymous, "Index of /ftp/Specs/archive/23_series/23.401", Internet Article retrieved from <http://www.3gpp.org/ftp/Specs/archive/23_series/23.401>, Apr. 21, 2009.

International Search Report and Written Opinion for PCT/IB2008/002856 dated Apr. 22, 2009.

3GPP TS 23.060 V8.2.0 ("3rd Generation Partnership Project; Technical Specification Group Services and System Aspects; General Packet Radio Service (GPRS); Service description; Stage 2 (Release 8)").

3GPP TS 23.401 V8.3.0 ("3rd Generation Partnership Project; Technical Specification Group Services and System Aspects; General Packet Radio Service (GPRS) enhancements for Evolved Universal Terrestrial Radio Access Network (E-UTRAN) access (Release 8)") (Sep. 2008).

3GPP TS 24.008 V8.3.0 ("3rd Generation Partnership Project; Technical Specification Group Core Network and Terminals; Mobile radio interface Layer 3 specification; Core network protocols; Stage 3 (Release 8)") (Sep. 2008).

3GPP TS 33.401 V8.1.1 ("3rd Generation Partnership Project; Technical Specification Group Services and System Aspects; 3GPP System Architecture Evolution (SAE); Security architecture (Release 8)") (Oct. 2008).

3GPP TS 33.abc V0.2.0 ("3rd Generation Partnership Project; Technical Specification Group Services and System Aspects; 3GPP System Architecture Evolution: Security Architecture; Release 8") (Oct. 2007).

3GPP TS 23.060 V7.5.0 ("3rd Generation Partnership Project; Technical Specification Group Services and System Aspects; General Packet Radio Service (GPRS); Service description; Stage 2 (Release 7)") (Sep. 2007).

3GPP TS 23.401 V1.3.0 ("3rd Generation Partnership Project; Technical Specification Group Services and System Aspects; GPRS enhancements for E-UTRAN access (Release 8)") (Oct. 2007).

3GPP TS 24.008 V7.9.0 ("3rd Generation Partnership Project; Technical Specification Group Core Network and Terminals; Mobile radio interface Layer 3 specification; Core network protocols; Stage 3 (Release 7)") (Sep. 2007).

The Notice of Preliminary Rejection with English Translation for Korean Patent Application No. 2010-7011672 dated Nov. 25, 2011, with English Translation of pending claims in KR2010-7011672 as of Nov. 25, 2011.

Chinese Patent Application No. 200880113927.9—Office Action dated Aug. 16, 2012.

Chinese Patent Application No. 200880113927.9—second office action dated May 21, 2013.

\* cited by examiner

SYSTEM AND METHOD FOR AUTHENTICATING A CONTEXT TRANSFER

CROSS-REFERENCE TO RELATED APPLICATION

This application claims the benefit of U.S. Provisional Application Ser. No. 60/983,450, filed Oct. 29, 2007, and titled "System and Method for Authenticating a Context Transfer from MME towards a Legacy 3GPP System," hereby incorporated by reference herein.

BACKGROUND

This section is intended to provide a background for material that is described below and/or recited in the claims. This background section may include concepts that could be pursued, but are not necessarily ones that have been previously conceived or pursued. Unless specifically indicated otherwise, this section is not prior art to the description and claims in this application and nothing in this section is admitted to be prior art.

In the Universal Mobile Telecommunications System (UMTS) Terrestrial Radio Access Network (UTRAN), a packet switched network temporary mobile station identifier (P-TMSI) signature (P-TMSI signature) is used to authenticate and to authorize the transfer of user equipment (UE) context information. As is generally understood in the art, packet data protocol (PDP) context information for a UE is a record of parameter values that provides information needed to establish a connection. Those parameters can include information about a type of PDP context being used, Quality of Service (QoS) information, etc. Authentication and authorization is performed when UE context information is transferred between network entities of a single system, or between network entities of different systems, when a serving General Packet Radio Service (GPRS) support node (SGSN) changes. Such a change can occur when the UE is being handed off because of movement to a different location. In this manner, the old SGSN (i.e., the SGSN from which the UE is being transferred) can verify that a context transfer request from a new SGSN (i.e., the SGSN to which the UE is transferring, also called a transferee SGSN) is valid and relates to the UE identified in the context transfer request. Hop-by-hop signaling between network elements may be protected by network domain security (NDS) so that no outsider can modify packets.

The mechanisms for authentication of requests to transfer context information in an Evolved 3rd Generation Partnership Project (3GPP) system are different from those in legacy UMTS and GPRS systems. In an evolved 3GPP system (also known as Evolved UTRAN (E-UTRAN) or Long Term Evolution (LTE)), which is discussed for example in 3GPP Technical Specification (TS) 23.401, the P-TMSI signature is not expected to be used. Instead, the non-access stratum (NAS)-level security association and corresponding keys and COUNT values are managed during the IDLE mode. All NAS-level signaling is authenticated, by integrity protection, with the NAS keys. As described in TS 23.401 and as known in the art, UE mobility in an evolved 3GPP network is controlled by an element known as a Mobility Management Entity (MME). Functions of an MME can include NAS signaling, Mobility Management (MM), NAS signaling security, and authentication. During mobility from an old MME to a new MME, the old MME authenticates a context transfer request and mobility signaling based on an NAS-Token calculated with an integrity protection key.

When a UE moves between UMTS, Global System for Mobile Communications (GSM) or GPRS and an evolved 3GPP system, the context transfer and mobility signaling must still be authenticated. However, there is an issue with regard to how an evolved 3GPP system authorizes context transfer requests or mobility signaling that comes from a UMTS/GPRS system that does not provide the same authorization mechanisms as the evolved 3GPP system. In particular, a transferee UMTS/GPRS network node (a node into the domain of which a UE is transferring) expects a P-TMSI signature from a UE (i.e., a mobile terminal or other device). The UMTS/GPRS node then provides that P-TMSI signature to a peer network entity (e.g., an SGSN from which the UE is transferring) when requesting context information for that UE. However, the evolved 3GPP system (EPS) does not provide for P-TMSI signature handling. Indeed, parts of the information element (IE) that hold the P-TMSI signature in a UTRAN system signaling message may be used for a different purpose in an evolved 3GPP system. For example, some of the bits of that IE may be needed in an evolved 3GPP system to hold parts of the Evolved Packet System TMSI (S-TMSI). This reduces the available bits for using authentication material for context transfer authorization.

SUMMARY

This Summary is provided to introduce a selection of concepts in a simplified form that are further described below in the Detailed Description. This Summary is not intended to identify key features or essential features of the invention.

According to at least some embodiments, a user equipment (UE) and an MME in an evolved 3GPP system each generates authentication material. That authentication material can be carried inside the P-TMSI signature field of a UMTS signaling message from the UE to the UMTS/GPRS SGSN when the UE is transferring to a UTRAN/GERAN system. That authentication material can also be communicated from the UMTS/GPRS SGSN to the MME (of the evolved 3GPP system) from which the UE is transferring. In this arrangement, the old MME can then authenticate the context transfer request from the legacy 3GPP system based on the transferred authentication material and knowledge as to how to create that authentication material.

In at least some embodiments, the MME and the UE derive the authentication material based on user-specific keys. The authentication material, which can be derived when NAS keys are created or on-demand, may then be embedded in the P-TMSI signature field content for legacy 3GPP signaling from the UE and from the UMTS/GPRS SGSN to the MME. In the event that one or more NAS keys are used (or keys derived from the NAS keys are used), the generated authentication material can be changed every time that the NAS keys change. In this manner, a sequence number need not be transferred within the P-TMSI signature field, thus providing improved security under the given length restrictions of the reused P-TMSI signature field. If NAS keys change every time the UE moves, e.g., from UTRAN to E-UTRAN, the authentication material will also be fresh when the UE moves back to UTRAN.

With various embodiments described herein, no mechanism similar to a P-TMSI signature is needed for the evolved 3GPP system, i.e., there is no need to create a P-TMSI signature in the MME prior to receipt of a context transfer authentication request. There is also no need to transfer a token or signature from the MME to the UE. The UE can generate authentication material (e.g., a token) on demand, thereby avoiding storage requirements for the token. That token can be carried in existing UMTS signaling messages.

These and other advantages and features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
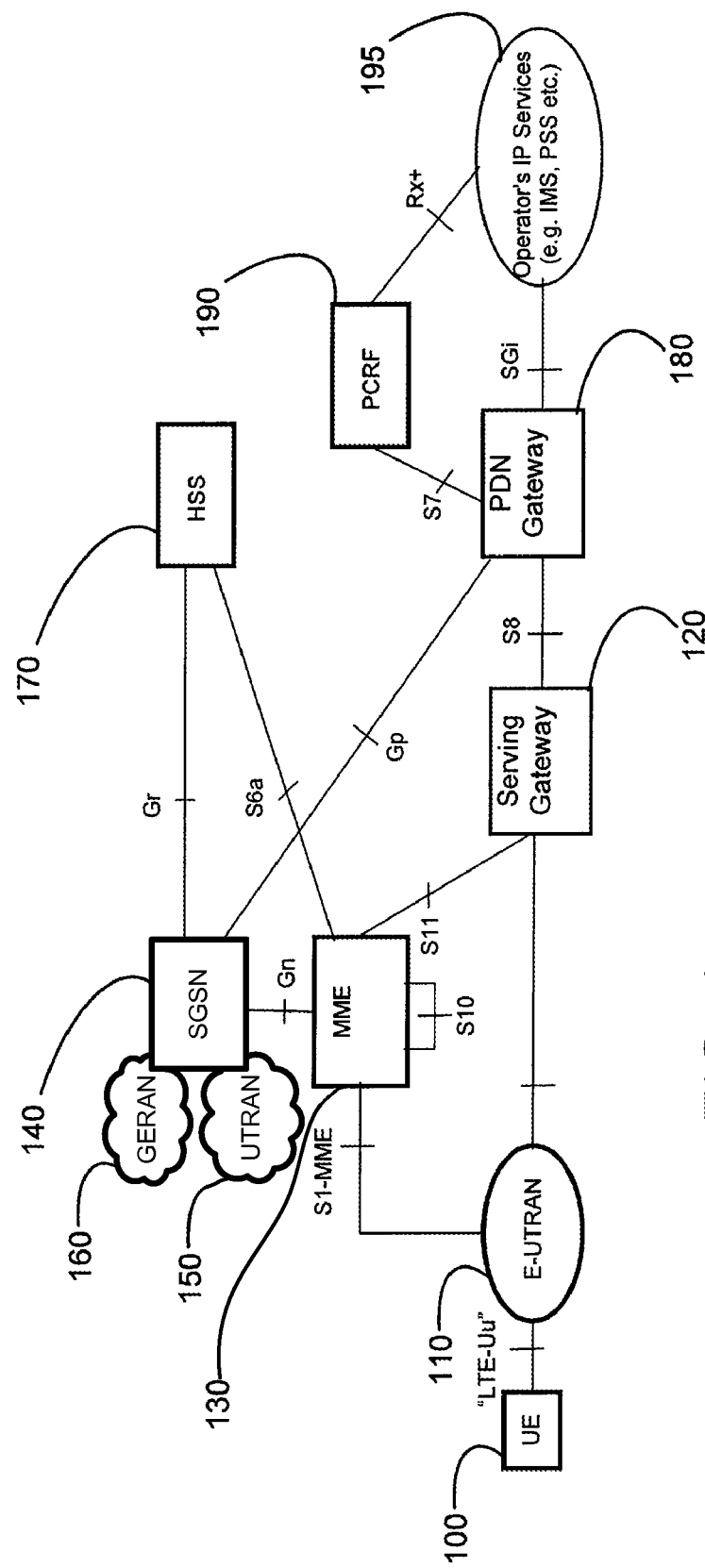
FIG. 1 is a block diagram of a roaming architecture for interoperation among early and evolved 3GPP standards releases according to at least some embodiments.

In at least some embodiments a user equipment (UE) and a Mobility Management Entity (MME) in an evolved 3GPP system each generates authentication material (e.g., a token). The authentication material can be carried inside a P-TMSI signature field of a legacy UMTS signaling message from the UE to a UMTS/GPRS SGSN in a UTRAN or in a GSM/Edge Radio Access Network (GERAN) into which the UE is transferring. For example, the UE may not be aware of whether it is transferring into the domain of an evolved 3GPP MME or into the domain of an SGSN in a legacy UTRAN or GERAN, and thus the UE may use legacy signaling for a UE-SGSN signaling RAU (Routing Area Update). The authentication material can also be used in a signaling message from the UMTS/GPRS SGSN to the old MME of the evolved 3GPP system from which the UE is transferring. In this arrangement, the UE creates the authentication material and provides it to the SGSN, with the SGSN then providing that authentication material to the old MME in a context transfer request. The old MME, with knowledge of how the authentication material was created in the UE, can then recreate authentication material upon receipt of a context transfer request identifying the UE and authenticate the context transfer request.

In some embodiments, the MME and UE derive authentication material based on at least one user-specific key (e.g., K_ASME, K_NASInt or K_NASenc). The authentication material can be derived when non-access stratum (NAS) keys are created or on-demand. If one or more NAS keys are used (or if one or more keys derived from the NAS keys are used), the generated authentication material can be changed every time that the NAS keys change. Therefore, a sequence number does not have to be transferred within the P-TMSI signature field, which provides improved security under the given length restrictions of the reused P-TMSI signature field. If NAS keys change every time the UE moves, e.g., from UTRAN to E-UTRAN, the authentication material will also be fresh when the UE moves back to UTRAN. If the higher level user specific key is used (e.g. K_ASME) the authentication material can be based on the current existing increasing sequence number value, such as the downlink or uplink non-access stratum (NAS) signaling COUNT value. COUNT is an increasing packet sequence number. COUNTs are stored in memory. Some number of highest bits of the COUNT value can be stored in the memory only and the rest of the bits can be signaled on the messages. Whenever there is NAS signaling, the COUNT values are updated and thus the authentication material will also be fresh.

With various embodiments described herein, no mechanism similar to a P-TMSI signature is needed for the evolved 3GPP system, and there is no need to transfer a P-TMSI signature (any other type of token or signature) from the MME to the UE or to create the authentication material prior to receipt of an authentication request from a transferee SGSN. The user equipment can also generate a token on demand, meaning that there are no storage requirements for the token. Still further, with various embodiments, the existing UMTS signaling messages can be used to carry the authentication material (e.g., the token).

FIG. 1 is a block diagram of a roaming architecture for interoperation among early and evolved 3GPP standards releases according to at least some embodiments. As shown in FIG. 1, UE 100 interacts with an Evolved UTRAN network (E-UTRAN) 110, which in turn is communicable with both a serving gateway (SGW) 120 and an MME 130. In addition to communicating with the SGW 120 directly, the MME 130 is also communicable with an SGSN 140, which is connected to both a UTRAN 150 and a GERAN 160. Both the MME 130 and the SGSN 140 also interact with a home subscriber server (HSS) 170. Both the SGSN 140 and the SGW 120 communicate with a private data network (PDN) gateway (PGW) 180, which in turn communicates with both a policy charging rule function (PCRF) 190 and the operator's own IP services 195.

Figure 2:
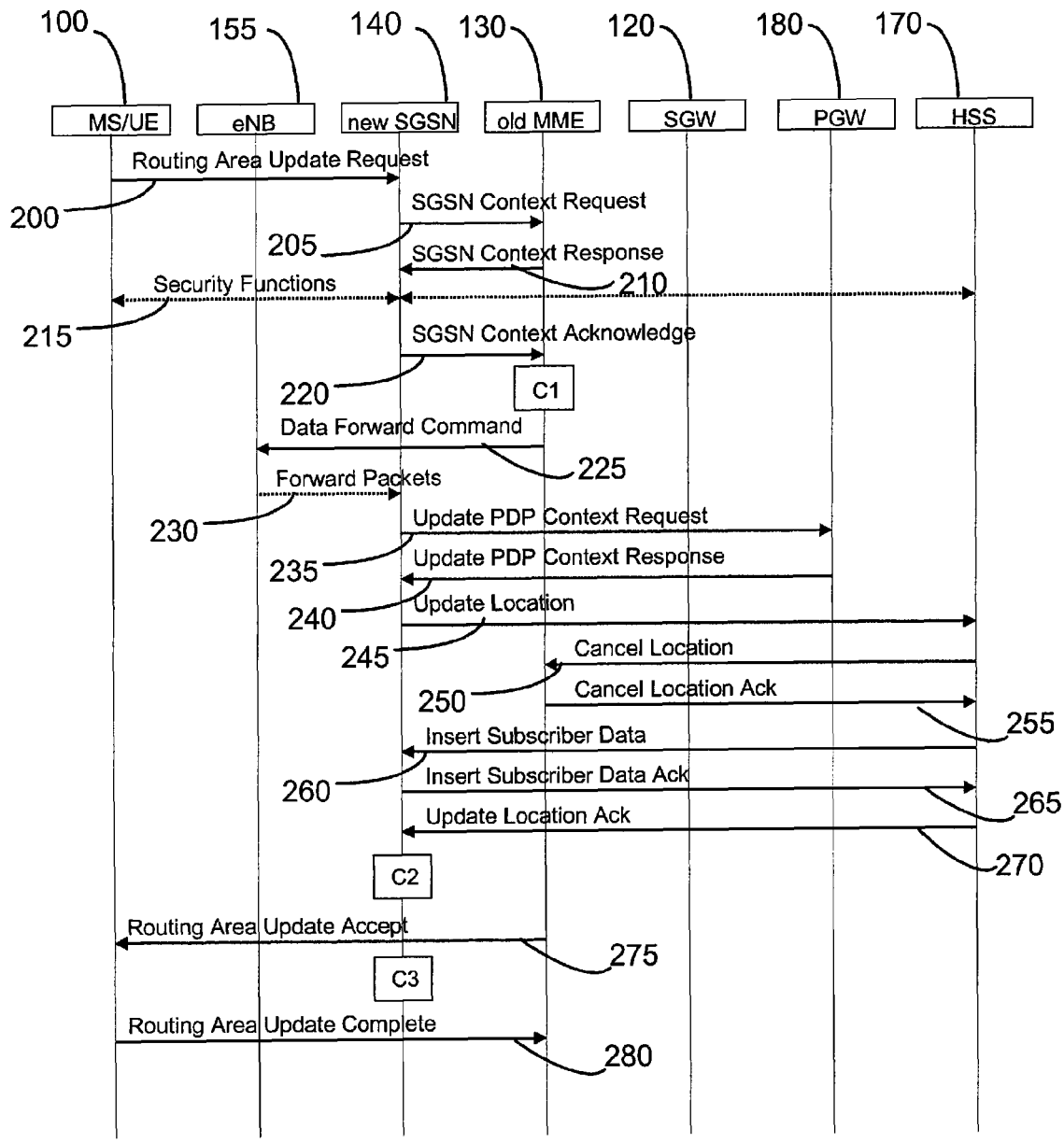
FIG. 2 is a chart showing exchanges of signals in an MME to SGSN routing area update procedure according to at least some embodiments.

FIG. 2 is a chart showing exchanges of signals in an MME to SGSN routing area update procedure according to at least some embodiments. In certain embodiments, the messages from and to the SGSN, as well as the information elements contained therein, are the same as specified in 3GPP Technical Specification (TS) 23.060 for the SGSN routing area update procedure. The messages from and to the MME 130 or the SGW 120, as well as the information elements contained therein, are the same as specified in this technical specification for the inter RAT (Radio Access Technology) routing area update procedure.

Referring to FIG. 2, the MME to SGSN routing area update procedure begins at 200, where the UE 100 sends a "routing area update request" to a new SGSN 140. The routing area update request includes information such as the old routing area identification (RAI), an NAS-Token (a non-access stratum authentication code, which is authentication material calculated by the UE and serving as the "old" P-TMSI signature), the update type, the classmark, discontinuous reception (DRX) parameters and the UE's network capability information. The base system station subsystem (BSS) adds the cell global identity including the real application cluster (RAC) and the location area code (LAC) of the cell where the message was received before passing the message to the new SGSN 140. The classmark contains the UE's GPRS multislot capabilities and supported GPRS ciphering algorithms, as defined in TS 24.008. DRX parameters indicate whether or not the UE uses discontinuous reception, and if so, the DRX cycle length. The UE 100 indicates one of its registered tracking area identities (TAIs) as the old RAI and calculates the NAS-Token as the old P-TMSI signature based on K_NASInt (an NAS integrity key specific to a user) or K_ASME (Access Security Management Entity key, a root key stored in MME and UE after successful authentication) and the respective NAS uplink or downlink COUNT (and incremental counter) value.

At 205 in FIG. 2, the new SGSN 140 sends an "SGSN context request" to the old MME 130 in order to obtain the mobility management (MM) and packet data protocol (PDP) contexts for the UE. The SGSN context request includes the old RAI, a temporary logical link identity (TLLI) and/or P-TMSI, the old P-TMSI signature, and the new SGSN address. As explained below, the old MME 130 may then send an "SGSN context response" at 210 back to the new SGSN 140.

The SGSN can direct the SGSN context request to the MME in various ways. If the new SGSN provides functionality for the intra-domain connection of radio access network (RAN) nodes to multiple core network (CN) nodes, the new SGSN may derive the old MME from the old RAI and the old P-TMSI (or TLLI) and send the SGSN context request message to this old MME. Otherwise, the new SGSN derives the old MME from the old RAI. The new SGSN 140 derives an MME that it believes is the old MME 130. This derived MME is itself the old MME 130, or it is associated with the same pool area as the actual old MME. A derived MME that is not the old MME determines the correct old MME 130 from the P-TMSI (or TLLI) and relays the message to the actual old MME 130.

Upon receipt of the SGSN context request, the old MME 130 validates the old P-TMSI signature value, which is the NAS-Token calculated by the user equipment, based on K_ASME and the respective NAS downlink COUNT value (which are known to MME 130). In the event that the MME has multiple K_ASME keys identified with different Key Set Identifiers (KSIs), for example due to a just-run Authentication and Key Agreement (AKA) procedure, the MME can calculate the authentication token with all available keys to determine if one of the available keys is a match. The old MME may also calculate and provide the token to the new SGSN. However, for replay protection reasons, if the COUNT value is used as a one parameter in the authentication token generation, it is re-used, i.e., it increases. The KSI can be also transferred inside the P-TMSI signature field, particularly in the case of variable length P-TMSI signature option. The COUNT value may not be synchronized between the UE and the MME due to NAS signaling message losses, thus, the MME may calculate the authentication token with a number of COUNT values within the range of the current COUNT value (e.g., [current NAS downlink COUNT−L, current NAS downlink COUNT]).

If the old P-TMSI signature is valid, then the old MME 130 responds with the "SGSN context response." The SGSN context response message includes information such as the MM context, PDP contexts, the network routing service (NRS), and the security context.

If a value calculated by the old MME 130 based on the received NAS sequence number and the stored old K_ASME does not match the NAC-Token received from the SGSN, the MME 130 responds with an appropriate error cause. This may initiate security functions in the new SGSN 140. If those security functions in SGSN 140 authenticate the UE 100 correctly, then the new SGSN 140 sends another SGSN context request (the old RAI, the TLLI, the user equipment/mobile station validated, new SGSN address) message to the old MME 130 indicating that the new SGSN 140 has authenticated the UE 100. If the new SGSN 140 indicates that it has authenticated the UE 100, then the old MME 130 responds with the "SGSN context response" as described above.

Upon sending an SGSN context response message, the old MME 130 stores the address of the new SGSN 140 so as to allow the old universal terrestrial radio access network base station (eNB), the serving gateway (SGW) 120 or other entities to forward data packets to the new SGSN 140. The old MME 130 then starts a timer, the purpose of which is discussed below. The MME maps Evolved Packet System (EPS) bearer information to PDP contexts. It is also determined whether and how to perform any data forwarding from an eNB 155 or the SGW 120 to the SGSN.

Upon receiving the SGSN context response, the new SGSN 140 ignores the UE 100 network capability contained in the MM context of the SGSN context response only if SGSN 140 has previously received a UE network capability in the routing area update request. The network routing service (NRS) in the SGSN context response indicates the UE 100 support of the network requested bearer control to the new SGSN 140. The security context in the SGSN context response includes the key set identifier (KSI) and UTRAN cipher key (CK)/integrity key (IK) derived from K_ASME (an access security management entity key). UMTS authentication vectors may also be included. E-UTRAN authentication vectors are not transferred outside of E-UTRAN, and thus not included in the in the SGSN context response.

At 215 in FIG. 2, various security functions may be executed. Such procedures are discussed, for example, in the "Security Function" section of 3GPP TS 23.060. If a ciphering mode is supported, the ciphering mode is set at this point. If the SGSN context response message previously transmitted at 210 did not include an international mobile station equipment identity and software version number (IMEISV), and if automatic device detection (ADD) is supported by the SGSN, then the SGSN may also retrieve the IMEISV from the UE 100 at this point. If the security functions fail, for example because the SGSN cannot determine the home location register (HLR) address to establish the "Send Authentication Info" dialogue, then a rejection message is returned to the user equipment 100, noting the appropriate cause.

At 220 in FIG. 2, the new SGSN 140 sends an "SGSN context acknowledge" message to the old MME 130. At this point, the old MME 130 marks, in its context information, that the information in the gateways and the HSS 170 are invalid. This triggers the SGW 120, the PDN gateway 180 and the HSS 170 to be updated if the UE 100 initiates a tracking area update procedure back to the old MME 130 before completing the ongoing routing area update procedure. If the security functions do not authenticate the UE 100 correctly, then the routing area update request is rejected, and the new SGSN 140 sends a reject indication to the old MME 130. The old MME 130 would then continue as if the SGSN context request 205 was never received.

If the UE 100 is authenticated correctly, however, it is also determined whether the old MME 130 is informed that the new SGSN 140 is ready to receive data packets belonging to the activated PDP contexts and how to perform any data forwarding from the eNB 155 or the SGW 120 to the new SGSN 140. In the event that the UE 100 is in an LTE_Active state in the old MME 130, then at 225 the old MME 130 sends a "data forward command" message to the eNB 155. The data forward command includes information such as the radio access bearer (RAB_ID), the transport layer address, and S1 transport association information.

At 230 in FIG. 2, the old eNB 155 duplicates the buffered network protocol data units (N-PDUs) and starts tunneling them to the new SGSN 140. Additional N-PDUs received from the SGW 120 before the MME 130 timer (described previously) expires are also duplicated and tunneled to the new SGSN 140. No N-PDUs are forwarded to the new SGSN 140 after the expiration of the timer.

At 235, the new SGSN 140 sends an "update PDP context request" to the respective PGW(s) 180. The update PDP context request includes information such as the address of the new SGSN 140, the Tunnel Endpoint Identifier (TEID), information concerning the negotiated quality of service (QoS), the serving network identity, common gateway interface (CGI)/serving area interface (SAI) information, the RAT type, a CGI/SAI/resource availability indicator (RAI) change support indication, and NRS information.

The new SGSN 140 sends the serving network identity to the PGW 180. The NRS indicates SGSN support of the network-requested bearer control. The new SGSN 140 indicates that it supports the procedure and, if it supports it, indicates that the UE 100 also supports it in the SGSN context response message 210 discussed previously. If the NRS is not included in the update PDP context request message 235, the PGW 180, following this procedure, performs a GGSN-Initiated PDP context modification to change the bearer control mode (BCM) to 'MS-Only' for all PDP-Address/APN-pairs for which the current BCM is 'NW_Only'.

The PGW(s) 180 update their PDP context fields and return an "update PDP context response" at 240. The update PDP context response includes information such as the TEID, prohibit payload compression information, Access Point Name (APN) restriction information, and information regarding whether a CGI/SAI/RAI change report is required. The prohibit payload compression information indicates that the SGSN 140 should negotiate no data compression for this PDP context.

At 245 in FIG. 2, the new SGSN 140 informs the Home Location Register (HLR) at the HSS 170 of the change of SGSN by sending "update location" information. This information may include the SGSN number, the SGSN address, the international mobile subscriber identity (IMSI), and the IMEISV. The IMEISV is sent if the ADD function is supported.

At 250, the HLR at the HSS 170 sends a "cancel location" instruction to the old MME 130. This message may include information such as the IMSI and cancellation type. In this message, the cancellation type is set to "Update Procedure". In the event that the MME 130 timer described previously is not running, then the old MME 130 removes the MM and EPS bearer contexts. Otherwise, the contexts are removed only when the timer expires. The old MME 130 also ensures that the MM and PDP contexts are kept in the old MME 130, in case the UE 100 initiates another inter-SGSN routing area update before completing the ongoing routing area update to the new SGSN 140. The old MME 130 acknowledges the cancel location instruction 250 with a "cancel location Ack", including the IMSI, at 255. It is also determined whether the old MME 130 or the eNB 155 needs to complete any forwarding of N-PDUs.

At 260, the HLR at the HSS 170 sends an "insert subscriber data" message to the new SGSN 140. This message includes the IMSI and GPRS subscription data. The new SGSN 140 validates the UE 100 presence in the new routing area (RA). If, due to regional subscription restrictions or access restrictions, the UE 100 is not allowed to be attached in the RA, then the new SGSN 140 rejects the routing area update request with an appropriate cause. The new SGSN 140 may also return an "insert subscriber data Ack" (including the IMSI and "SGSN area restricted" information) message to the HLR at 265. If all checks are successful, then the SGSN constructs an MM context for the UE 100 and returns an "insert subscriber data Ack" message to the HLR (also represented at 265), with the message including the IMSI. At 270 in FIG. 2, the HLR at the HSS 170 acknowledges the "update location" message by sending an "update location Ack" message, including the IMSI, to the new SGSN 140.

After the above, the new SGSN 140 validates the presence of the UE 100 in the new RA. If, due to roaming restrictions or access restrictions, the UE 100 is not allowed to be attached in the new SGSN 140, or if subscription checking fails, then the new SGSN 140 rejects the routing area update with an appropriate cause. If all checks are successful, then the new SGSN 140 constructs MM and PDP contexts for the user equipment. A logical link is established between the new SGSN 140 and the UE 100. The new SGSN 140 then responds to the UE 100 with a "routing area update accept" message at 275, including a new P-TMSI, a new P-TMSI signature, and a receive N-PDU number. It is also determined whether and how N-PDU numbers are used. For example, the receive N-PDU number includes the acknowledgements for each acknowledged-mode network layer service access point identifier (NSAPI) used by the UE 100, thereby confirming that all mobile-originated N-PDUs are successfully transferred before the start of the update procedure.

At 280 in FIG. 2, the UE 100 acknowledges the new P-TMSI by returning a "routing area update complete" message, including the receive N-PDU number, to the new SGSN 140. At this time, the logical link control (LLC) and the subnetwork dependent convergence protocol (SNDCP) in the UE 100 are reset. Once again, it is also determined whether and how N-PDU numbers are used. For example, the received N-PDU number contains the acknowledgements for each acknowledged-mode NSAPI used by the UE 100, thereby confirming all mobile-terminated N-PDUs are successfully transferred before the start of the update procedure. If the received N-PDU number confirms the reception of N-PDUs that were forwarded from the old MME 130, then these N-PDUs may be discarded by the new SGSN 140. When the timer in MME 130 discussed previously expires, the old MME 130 releases any eNB and SGW resources (not shown).

In the event of a rejected routing area update operation, due to regional subscription, roaming restrictions, access restrictions, or because the SGSN cannot determine the HLR address to establish the locating updating dialogue, then the new SGSN 140 does not construct an MM context. A reject message is returned to the UE 100 with an identification of the respective cause. The UE 100 does not re-attempt a routing area update to that RA. The RAI value is deleted when the UE 100 is powered up. If the new SGSN 140 is unable to update the PDP context in one or more PGWs 180, then the new SGSN 140 deactivates the corresponding PDP contexts. This should not cause the SGSN to reject the routing area update, however.

The PDP contexts are sent from the old MME 130 to the new SGSN 140 in a prioritized order, i.e. the most important PDP context is sent first in the SGSN context response message. It should be noted that the exact prioritization method to be used may be implementation-dependent. In certain embodiments, however, the prioritization is based on the current activity. The new SGSN 140 determines the maximum APN restriction based on the received APN restriction of each PDP context from the PGW 180 and then stores the new maximum APN restriction value.

If the new SGSN 140 is unable to support the same number of active PDP contexts as received from old MME 130, then new SGSN 140 may use the prioritization sent by the old MME 130 as input when deciding which PDP contexts are to maintain active and which ones should be deleted. In any event, the new SGSN 140 first updates all contexts in one or more PGWs 180 and then deactivate the context(s) that it cannot maintain. This should not cause the SGSN to reject the routing area update.

If the previously-described timer at the old MME 130 expires, and if no cancel location message (including the IMSI) was received from the HLR, then the old MME 130 stops forwarding N-PDUs to the new SGSN 140. If the routing area update procedure fails a maximum allowable number of times, or if the SGSN 140 returns a routing area update reject (Cause) message, then the user equipment enters an IDLE state.

Also shown in FIG. 2 is a depiction of various embodiments which use Customized Applications for Mobile Network Enhanced Logic (CAMEL) interaction. At C1 in FIG. 2, CAMEL_GPRS_PDP_Context_Disconnection, CAMEL_GPRS_Detach and CAMEL_PS_Notification procedures are invoked at the old MME 130. In particular, the CAMEL_GPRS_PDP_Context_Disconnection procedure is called first and is invoked several times—once per PDP context. The procedure returns "Continue" as the result. The CAMEL_GPRS_Detach procedure is then called once. This procedure also returns "Continue" as a result. Finally, the CAMEL_PS_Notification procedure is called once. Yet again, the procedure returns "Continue" as a result.

At C2 in FIG. 2, CAMEL_GPRS_Routeing_Area_Update_Session and CAMEL_PS_Notification procedures are called at the new SGSN 140. In particular, the CAMEL_GPRS_Routeing_Area_Update_Session procedure is called first. The procedure returns "Continue" as a result. The CAMEL_PS_Notification procedure is then called, also returning "Continue" as a result. At C3 in FIG. 2, the CAMEL_GPRS_Routeing_Area_Update_Context procedure is called several times—once per PDP context—and it returns "Continue" as a result.

There are several approaches that may be used to generate the authentication material that can be embedded in the P-TMSI signature field in accordance with various embodiments. In each embodiment discussed herein, NAS keys or keys derived therefrom are used, although the method for precisely how to generate the keys may vary. Therefore, it should be understood that those methods of authentication material generation described herein are only exemplary in nature. In the approaches discussed herein, the old MME 130 does not need to transfer the authentication material towards the user equipment beforehand, as is done after the allocation of the P-TMSI signature for SGSN/UMTS (SGSN/GSM) transfers. This is because in the embodiments discussed herein, the authentication information is based on user-specific keys. This allows for the enhancement of security, as the downlink transfer of authentication material to the user equipment can be avoided.

In one particular embodiment, a Token based on NAS keys is calculated over some or all of the parts of the UTRAN message. In this arrangement, the information elements that are sent to the SGSN 140 are forwarded from the new SGSN 140 to the old MME 130 so that the old MME 130 can calculate the NAS-Token based on the received message (i.e., the authentication code based on the UE identified in the message). In a variant of this method, the contents over which the NAS-Token is calculated is predefined, and the message received by the MME points to the correct values (the user equipment identification by P-TMSI). In this case, the NAS sequence number (SN) is not transferred inside the (P-)TMSI signature, but may be used as an input parameter. This requires that the NAS-level SN value also be included in the P-TMSI signature field so that the MME 130 can form the correct COUNT value as an input parameter for the NAS-Token calculation. The COUNT value is used, as in normal NAS message protection, for reply protection reasons.

The following are two variants of the P-TMSI signature information elements. The first variant is of a fixed size, while the second variant is of a variable size. In the case of the fixed size P-TMSI signature information element, the NAS-Token with the NAS sequence number is truncated to the fixed length of e.g., 24 bits (the size of the P-TMSI in the fixed size information element). In the case of the variable size P-TMSI signature information element, the full 32 bit (or more) NAS-Token and sequence number (e.g., 4 bits or more) can be used. Support for both fixed size and variable size P-TMSI signatures may be implemented, when carrying the context transfer authentication information within the legacy signalling message inside the P-TMSI signature information element.

In some embodiments, the NAS keys are used to create a one time token at both the user equipment and the MME. An example authentication token or authentication key derivation function is as follows:

NAS_Token=KDF(K_NASInt∥K_NASenc∥S-TMSI∥"E-UTRAN to UTRAN authentication token")

In the above, KDF is a key derivation function and K_NASint and K_NASenc are NAS integrity and ciphering keys. The symbol "∥" denotes concatenation, and the string within the quotation marks (" ") is a constant. In an alternative case, where the S-TMSI change is sufficient to refresh the authentication token, the derivation is as follows:

NAS_Token=KDF (K_ASME∥S-TMSI∥"E-UTRAN to UTRAN authentication token")

In the above, S-TMSI is the temp id as used in the MME, and K_ASME is a root key from which the NAS keys are derived. NAS keys are as defined in TS 33.abc. In still another alternative, the COUNT value is also taken an input parameter, making the derivation function as follows:

NAS_Token=KDF(K_NASint∥K_NASenc∥S-TMSI COUNT∥"E-UTRAN to UTRAN authentication token")

or

NAS_Token=KDF(K_ASME∥S-TMSI∥COUNT∥"E-UTRAN to UTRAN authentication token")

In the simplest form neither the S-TMSI nor the string is needed. This is illustrated as follows:

NAS-Token=KDF(K_ASME∥COUNT)

All the NAS-Token derivations may further include a constant value to differentiate the NAS-Token derivation from other derivations.

The following is a discussion concerning the moment of creation of the authentication token described above. Synchronization of the input parameters for token creation at the user equipment and MME can be accomplished, in one particular embodiment, by defining the synchronization points. At each successful registration in the MME in this arrangement, the token is re-created using the available input parameters and stored at both ends for reuse. Alternatively, the synchronization of the input parameters for token creation at the user equipment and the MME can be accomplished by relying on the latest available parameters of NAS keys, S-TMSI, etc. and coping with one retry possibility in the event that the input parameters have been changed. For example, an NAS key update with a new key in EPS just after the handover request to UTRAN may cause the MME to calculate a different token. In this arrangement, the advance storing of tokens is avoided.

In embodiments discussed above, if the context transfer authentication fails, the network/signalling behaviour should be the same.

The P-TMSI signature information element defined by UMTS has only local significance for the SGSN that generates it and allocates it to the user equipment. In the evolved 3GPP system, both the user equipment and the MME calculate the authentication token. Therefore, the MME does not have to provide a similar signature for the user equipment as in UTRAN, i.e., there is no "P-TMSI signature" transfer to the user equipment from the MME.

The security level of the approaches described above differs depending upon the particular implementation. In general, the longer the authentication material, the better the protection against Denial of Service (DoS) attacks.

Figure 3:
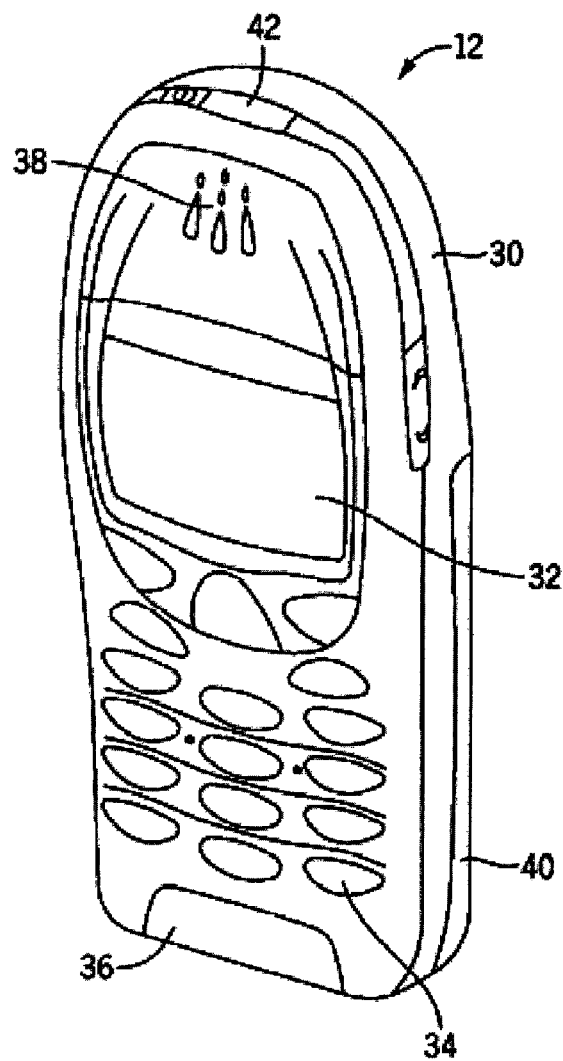
FIG. 3 is a perspective view of an electronic device that can be used in conjunction with an implementation of at least some embodiments.
Figure 4:
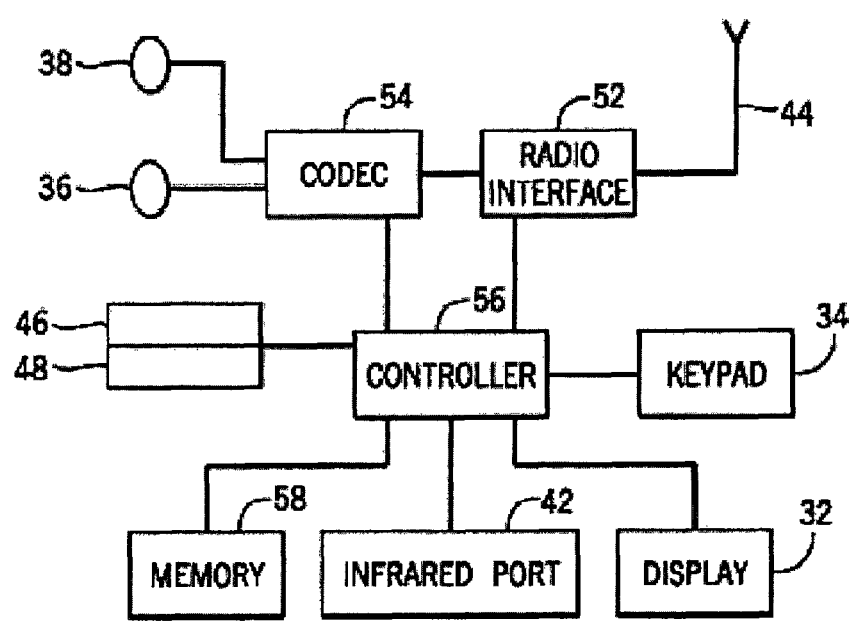
FIG. 4 is a schematic representation of the circuitry which may be included in the electronic device of FIG. 3.

FIGS. 3 and 4 show one representative mobile device 12 which may act as a user equipment (UE) with which various embodiments may be implemented. Devices described herein may include any and/or all of the features described in FIGS. 3 and 4. It should be understood, however, that the present invention is not intended to be limited to one particular type of electronic device. The mobile device 12 of FIGS. 3 and 4 includes a housing 30, a display 32 in the form of a liquid crystal display, a keypad 34, a microphone 36, an ear-piece 38, a battery 40, an infrared port 42, an antenna 44, a smart card 46 in the form of a Universal Integrated Circuit Card (UICC) according to one embodiment, a card reader 48, radio interface circuitry 52, codec circuitry 54, a controller 56 and a memory 58. Individual circuits and elements are, except for programming and/or other instructions needed to carry out methods and procedures described herein, all of a type known in the art. In some embodiments, a device may include less than all of the components shown in FIGS. 3 and 4. For example, a dongle or other peripheral component connectable (e.g., by a Universal Serial Bus plug) to a laptop computer or other device may include an antenna, radio interface circuitry, a controller and memory, but may lack a display, keyboard, microphone and/or infrared port.

Certain embodiments described herein are described in the general context of method steps or processes, which may be implemented in one embodiment by a computer program product, embodied in a computer-readable storage medium, including computer-executable instructions, such as program code, executed by one or more computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside on a chipset (e.g., one or more integrated circuits (ICs) or application-specific integrated circuits (ASICs)), a mobile device, a desktop, a laptop, a server, a dongle or other peripheral component, etc. The application logic, software or an instruction set is preferably maintained on any one of various conventional computer-readable media. In the context of this document, a "computer-readable medium" can be any media or means that can contain, store, communicate, propagate or transport the instructions for use by or in connection with an instruction execution system, apparatus, or device.

Software and web implementations of various embodiments can be accomplished with standard programming techniques with rule-based logic and other logic to accomplish various database searching steps or processes, correlation steps or processes, comparison steps or processes and decision steps or processes. It should be noted that the words "component" and "module," as used herein, are intended to include implementations using one or more lines of software code, and/or hardware implementations, and/or equipment for receiving manual inputs.

Figure 5:
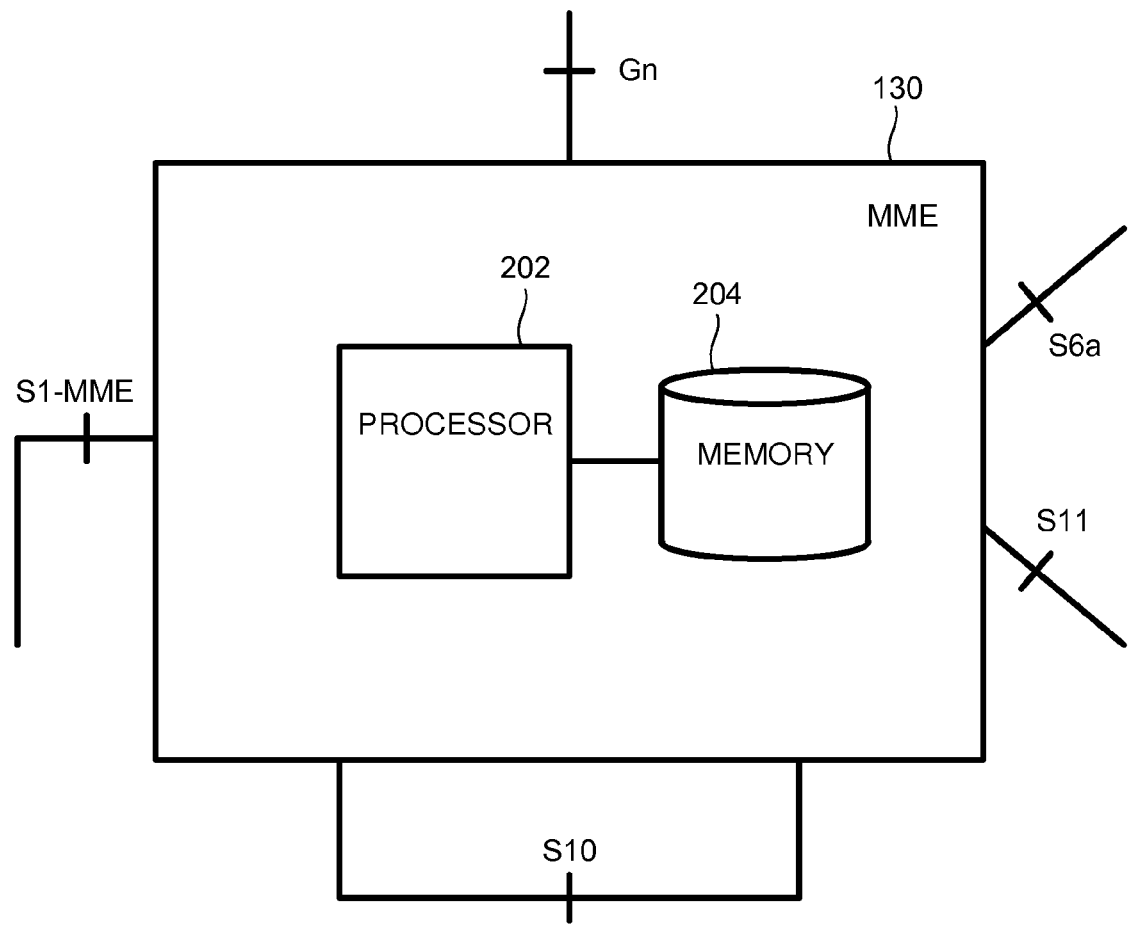
FIG. 5 is a block diagram of the MME shown in FIG. 2.

FIG. 5 is a block diagram showing additional details of MME 130 from FIG. 2. MME 130 includes one or more processors 202 and one or more memories 204, which memories can be volatile (e.g., random access memory (RAM)), non-volatile (e.g., a magnetic disc drive) or include both volatile and non-volatile components. MME 130 can be a stand-alone server or other network element, or may reside within a network element that also performs other network functions. Inputs to and outputs from MME 130 across the various interfaces shown (i.e., the S1-MME, S10, S11, S6a and Gn interfaces), as well as across other interfaces, may be over separate physical media. Alternatively, communications over multiple interfaces may combined over a single physical connection (e.g., as separate packets over a single IP network physical connection). Processor 202 receives and sends communications over the various shown interfaces, and communicates with memory 204 to retrieve and store data, so as to carry out the MME operations described herein.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

The invention claimed is:

1. A method comprising:
receiving, by a second network entity from a first network entity, a context transfer request that comprises a Packet Switched Network Temporary Mobile Station Identifier (P-TMSI) signature information field including comprising authentication material corresponding to a mobile device, wherein the authentication material comprises at least a portion of a Non-Access Stratum (NAS) token;
calculating, by the second network entity, validation material from information known by the second network entity to be stored by the mobile device, wherein the validation material was not previously transferred from the second network entity to the mobile device; and
determining, by the second network entity, whether the validation material matches the authentication material.

2. The method of claim 1, further comprising:
upon determining that the validation material matches the authentication material, authenticating the context transfer request and transferring context information to the first network entity.

3. The method of claim 1, further comprising:
upon determining that the validation material does not match the authentication material, sending an error message to the first network entity;
subsequent to sending the error message, receiving a second context transfer request from the first network entity, the second context transfer request indicating authorization of the mobile device; and in response to the second context transfer request, transferring context information to the first network entity.

4. The method of claim 1, wherein the first network entity comprises an entity within a legacy 3rd Generation Partnership (3GPP) Universal Mobile Telecommunications System (UMTS) network, a legacy 3GPP General Packet Radio Service (GPRS) network or a Global System for Mobile communications (GSM) Edge Radio Access Network (GERAN), and wherein the second network entity is a Mobility Management Entity in an evolved 3GPP network.

5. The method of claim 1, wherein the validation material is derived from at least one user-specific key.

6. The method of claim 5, wherein the at least one user-specific key is an Access Security Management Entity key (K_ASME).

7. The method of claim 5, wherein the at least one user-specific key is derived from at least one Access Security Management Entity key (K_ASME).

8. The method of claim 1, wherein the authentication material comprises at least a portion of a token derived from an Access Security Management Entity key (K_ASME).

9. The method of claim 1, wherein the authentication material comprises a token calculated over at least a portion of one of a Universal Mobile Telecommunications System (UMTS) Terrestrial Radio Access Network (UTRAN) message and a Global System for Mobile communications/Edge Radio Access Network (GERAN) message.

10. A non-transitory computer-readable medium storing computer-executable instructions configured to, when executed, cause an apparatus to at least:

receive, from a first network entity, a context transfer request that comprises a Packet Switched Network Temporary Mobile Station Identifier (P-TMSI) signature information field including comprising authentication material corresponding to a mobile device, wherein the authentication material comprises at least a portion of a Non-Access Stratum (NAS) token;

calculate validation material from information known by the apparatus to be contained stored by the mobile device, wherein the validation material was not previously transferred from the apparatus to the mobile device; and determine whether the validation material matches the authentication material.

11. The non-transitory computer-readable medium of claim 10, wherein the computer-executable instructions are configured to, when executed, cause the apparatus to:

upon determining that the validation material matches the authentication material, authenticate the context transfer request and transfer context information to the first network entity.

12. The non-transitory computer-readable medium of claim 10, wherein the computer-executable instructions are configured to, when executed, cause the apparatus to:

upon determining that the validation material does not match the authentication material, send an error message to the first network entity;

subsequent to sending the error message, receive a second context transfer request from the first network entity, the second context transfer request indicating authorization of the mobile device; and in response to the second context transfer request, transfer context information to the first network entity.

13. The non-transitory computer-readable medium of claim 10, wherein the first network entity comprises an entity within a legacy 3rd Generation Partnership (3GPP) Universal Mobile Telecommunications System (UMTS) network, a legacy 3GPP General Packet Radio Service (GPRS) network or a Global System for Mobile communications (GSM) Edge Radio Access Network (GERAN), and wherein the apparatus is configured to operate as a Mobility Management Entity in an evolved 3GPP network.

14. The non-transitory computer-readable medium of claim 10, wherein the validation material is derived from at least one user-specific key.

15. The non-transitory computer-readable medium of claim 14, wherein the at least one user-specific key is an Access Security Management Entity key (K_ASME).

16. The non-transitory computer-readable medium of claim 14, wherein the at least one user-specific key is derived from at least one Access Security Management Entity key (K_ASME).

17. The non-transitory computer-readable medium of claim 10, wherein the authentication material comprises at least a portion of a token derived from an Access Security Management Entity key (K_ASME).

18. The non-transitory computer-readable medium of claim 10, wherein the authentication material comprises a token calculated over at least a portion of one of a Universal Mobile Telecommunications System (UMTS) Terrestrial Radio Access Network (UTRAN) message and a Global System for Mobile communications/Edge Radio Access Network (GERAN) message.

19. An apparatus comprising:

at least one processor;

at least one memory storing executable instructions configured to, with the at least one processor, cause the apparatus to at least:

receive, from a first network entity, a context transfer request that comprises a Packet Switched Network Temporary Mobile Station Identifier (P-TMSI) signature information field comprising authentication material corresponding to a mobile device, wherein the authentication material comprises at least a portion of a Non-Access Stratum (NAS) token;

calculate validation material from information known by the apparatus to be stored by the mobile device, wherein the validation material was not previously transferred from the apparatus to the mobile device; and determine whether the validation material matches the authentication material.

20. The apparatus of claim 19, wherein the executable instructions are configured to, with the at least one processor, cause the apparatus to:

upon determining that the validation material matches the authentication material, authenticate the context transfer request and transfer context information to the first network entity.

21. The apparatus of claim 19, wherein the executable instructions are configured to, with the at least one processor, cause the apparatus to:

upon determining that the validation material does not match the authentication material, send an error message to the first network entity;

subsequent to sending the error message, receive a second context transfer request from the first network entity, the second context transfer request indicating authorization of the mobile device; and in response to the second context transfer request, transfer context information to the first network entity.

22. The apparatus of claim 19, wherein the first network entity comprises an entity within a legacy 3rd Generation Partnership (3GPP) Universal Mobile Telecommunications System (UMTS) network, a legacy 3GPP General Packet Radio Service (GPRS) network or a Global System for Mobile communications (GSM) Edge Radio Access Network (GERAN), and wherein the apparatus is configured to operate as a Mobility Management Entity in an evolved 3GPP network.

23. The apparatus of claim 19, wherein the validation material is derived from at least one user-specific key.

24. The apparatus of claim 23, wherein the at least one user-specific key is an Access Security Management Entity key (K_ASME).

25. The apparatus of claim 23, wherein the at least one user-specific key is derived from at least one Access Security Management Entity key (K_ASME).

26. The apparatus of claim 19, wherein the authentication material comprises at least a portion of a token derived from an Access Security Management Entity key (K_ASME).

27. The apparatus of claim 19, wherein the authentication material comprises a token calculated over at least a portion of one of a Universal Mobile Telecommunications System (UMTS) Terrestrial Radio Access Network (UTRAN) message and a Global System for Mobile communications/Edge Radio Access Network (GERAN) message.

28. A method comprising:
operating a mobile device within a first wireless network;
calculating authentication material in the mobile device based on information shared with an element of the first wireless network;
transmitting a routing area update request corresponding to a Mobility Management Entity (MME) to General Packet Radio Service support node (SGSN) routing area update procedure from the mobile device when the mobile device is in a second wireless network, wherein the second wireless network is different from the first wireless network, and wherein the routing area update request comprises a Packet Switched Network Temporary Mobile Station Identifier (P-TMSI) signature information field comprising the authentication material, wherein the authentication material comprises at least a portion of a Non-Access Stratum (NAS) token; and
receiving at the mobile device, as a result of transmitting the routing area update request, a routing area update acceptance from the second wireless network.

29. The method of claim 28, wherein the first wireless network is an evolved 3rd Generation Partnership (3GPP) network, and wherein the second wireless network is one of a legacy 3rd Generation Partnership (3GPP) Universal Mobile Telecommunications System (UMTS) network, a legacy 3GPP General Packet Radio Service (GPRS) network or a Global System for Mobile communications (GSM) Edge Radio Access Network (GERAN).

30. The method of claim 28, wherein the authentication material comprises at least a portion of a token derived from an Access Security Management Entity key (K_ASME).

31. A non-transitory computer-readable medium storing computer-executable instructions configured to, when executed, cause an apparatus to at least:
operate within a first wireless network;
calculate authentication material based on information shared with an element of the first wireless network;
transmit a routing area update request that corresponds to a Mobility Management Entity (MME) to General Packet Radio Service support node (SGSN) routing area update procedure when the apparatus is in a second wireless network, wherein the second wireless network is different from the first wireless network, and wherein the routing area update request comprises a Packet Switched Network Temporary Mobile Station Identifier (P-TMSI) signature information field including comprising the authentication material wherein the authentication material comprises at least a portion of a Non-Access Stratum (NAS) token; and
receive, as a result of transmitting the routing area update request, a routing area update acceptance from the second wireless network.

32. The non-transitory computer-readable medium of claim 31, wherein the first wireless network is an evolved 3rd Generation Partnership (3GPP) network, and wherein the second wireless network is one of a legacy 3rd Generation Partnership (3GPP) Universal Mobile Telecommunications System (UMTS) network, a legacy 3GPP General Packet Radio Service (GPRS) network or a Global System for Mobile communications (GSM) Edge Radio Access Network (GERAN).

33. The non-transitory computer-readable medium of claim 31, wherein the authentication material comprises at least a portion of a token derived from an Access Security Management Entity key (K_ASME).

34. An apparatus comprising:
at least one processor; and
at least one memory storing executable instructions configured to, with the at least one processor, cause the apparatus to at least:
operate within a first wireless network;
calculate authentication material based on information shared with an element of the first wireless network;
transmit a routing area update request that corresponds to a Mobility Management Entity (MME) to General Packet Radio Service support node (SGSN) routing area update procedure when the apparatus is in a second wireless network, wherein the second wireless network is different from the first wireless network, and wherein the routing area update request comprises a Packet Switched Network Temporary Mobile Station Identifier (P-TMSI) signature information field comprising the authentication material, wherein the authentication material comprises at least a portion of a Non-Access Stratum (NAS) token; and
receive, as a result of transmitting the routing area update request, a routing area update acceptance from the second wireless network.

35. The apparatus of claim 34, wherein the first wireless network is an evolved 3rd Generation Partnership (3GPP) network, and wherein the second wireless network is one of a legacy 3rd Generation Partnership (3GPP) Universal Mobile Telecommunications System (UMTS) network, a legacy 3GPP General Packet Radio Service (GPRS) network or a Global System for Mobile communications (GSM) Edge Radio Access Network (GERAN).

36. The apparatus of claim 34, wherein the authentication material comprises at least a portion of a token derived from an Access Security Management Entity key (K_ASME).

* * * * *

UNITED STATES PATENT AND TRADEMARK OFFICE
CERTIFICATE OF CORRECTION

| | |
|---|---|
| PATENT NO. | : 9,204,295 B2 |
| APPLICATION NO. | : 12/259479 |
| DATED | : December 1, 2015 |
| INVENTOR(S) | : Marc Blommaert et al. |

It is certified that error appears in the above-identified patent and that said Letters Patent is hereby corrected as shown below:

In the claims,

In Column 12, Claim 1, Line 45
  Please delete "field including comprising" and replace with -- field comprising --

In Column 13, Claim 10, Line 36
  Please delete "field including comprising" and replace with -- field comprising --

In Column 13, Claim 10, Line 41
  Please delete "be contained stored" and replace with -- be stored --

In Column 16, Claim 31, Line 9
  Please delete "field including comprising" and replace with -- field comprising --

Signed and Sealed this
Nineteenth Day of April, 2016

Michelle K. Lee
*Director of the United States Patent and Trademark Office*